United States Patent
Pan et al.

(10) Patent No.: US 12,405,158 B2
(45) Date of Patent: Sep. 2, 2025

(54) ABNORMAL SOUND DETECTION DEVICE AND ABNORMAL SOUND DETECTION METHOD

(71) Applicant: Primax Electronics Ltd., Taipei (TW)

(72) Inventors: Yung-Tai Pan, Taipei (TW); Ting-Yuan Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 208 days.

(21) Appl. No.: 18/501,929

(22) Filed: Nov. 3, 2023

(65) Prior Publication Data

US 2025/0060247 A1 Feb. 20, 2025

(30) Foreign Application Priority Data

Aug. 16, 2023 (TW) ................................. 112130765

(51) Int. Cl.
| | |
|---|---|
| *G01H 13/00* | (2006.01) |
| *H04R 1/40* | (2006.01) |
| *H04R 3/00* | (2006.01) |

(52) U.S. Cl.
CPC ............ *G01H 13/00* (2013.01); *H04R 1/406* (2013.01); *H04R 3/005* (2013.01)

(58) Field of Classification Search
CPC ......... G01H 13/00; H04R 1/406; H04R 3/005
USPC ............................................. 381/56, 58, 122
See application file for complete search history.

(56) References Cited

U.S. PATENT DOCUMENTS

| | | | | |
|---|---|---|---|---|
| 2007/0261493 A1* | 11/2007 | Kim | ..................... | G01M 5/0033 73/594 |
| 2011/0175813 A1* | 7/2011 | Sarwar | ..................... | G06F 3/044 381/56 |
| 2019/0166442 A1* | 5/2019 | Kishi | ...................... | G10L 25/18 |

* cited by examiner

*Primary Examiner* — William A Jerez Lora
(74) *Attorney, Agent, or Firm* — KIRTON McCONKIE; Evan R. Witt (57) ABSTRACT

An abnormal sound detection device for detecting a peripheral interface device includes a vibration simulation mechanism, a movable-type audio collecting device and a controlling and analyzing device. The vibration simulation mechanism includes a mechanism body. The peripheral interface device is accommodated within the mechanism body. The vibration simulation mechanism generates a vibration force. The peripheral interface device generates a vibration sound wave in response to the vibration force. The movable-type audio collecting device collects the vibration sound wave. The audio collecting device generates a vibration audio signal in response to the vibration sound wave. The controlling and analyzing device generates an abnormal sound detection signal to control the vibration simulation mechanism to generate the vibration force. The controlling and analyzing device detects and identifies whether there is an abnormal sound phenomenon in the vibration audio signal.

20 Claims, 6 Drawing Sheets

ABNORMAL SOUND DETECTION DEVICE AND ABNORMAL SOUND DETECTION METHOD

FIELD OF THE INVENTION

The present invention relates to an abnormal sound detection device and an abnormal sound detection method applied to the abnormal sound detection device, and more particularly to an abnormal sound detection device for detecting whether a peripheral interface device has an abnormal sound phenomenon and an abnormal sound detection method applied to the abnormal sound detection device.

BACKGROUND OF THE INVENTION

Nowadays, various consumer electronic information products or consumer communication products on the market are becoming thinner and thinner. In addition, these products are usually equipped with various audio-visual functions to meet people's consumption and entertainment needs.

For example, the trends in designing notebook computers are toward small size and slimness. Consequently, various internal components in the notebook computer are getting closer to each other or contacted with each other. Generally, a notebook computer is equipped with a peripheral interface device (e.g., a key mechanical structure) for allowing the user to perform the key input operation. In addition, the notebook computer usually has a built-in sound device for outputting the sound. The sound device is an active component including plural speaker units. During the operation of the sound device, the plural speaker units are driven to convert various normal sound effect signals (such as music) into a vibration wave in a vibrating manner. Consequently, the sound that can be heard by the human ears is generated.

Furthermore, due to the limitation of the internal space, the installation position of the sound device is usually close to the key mechanical structure. Consequently, the vibration force generated by these speaker units (for example, the vibration force of the speaker units is caused by a certain segment of a music at a certain frequency) will result in a vibration effect on various mechanical structures (e.g., a scissors-type connecting structure under the key) of the key mechanical structure (i.e., a passive component) to produce a vibration sound wave. In case that the assembling or designing equality of an electronic product is in an abnormal condition, it is easy to produce unexplained high-frequency resonance audio signals. In addition, this abnormal sound phenomenon is easily sensed by the human ears.

Therefore, in the production process of the slim electronic product, it is important to timely detect the unexpected high-frequency resonance audio signal or abnormal sound and eliminate or improve the abnormal sound phenomenon in advance.

Conventionally, an abnormal sound detection device was used in the industry to detect the assembling quality status of the electronic product during the production process. The conventional abnormal sound detection device is equipped with a vibration simulation mechanism. A passive component to be tested is accommodated within the vibration simulation mechanism. For example, the passive component is a peripheral interface device (e.g., a key mechanical structure). Then, the vibration simulation mechanism generates a vibration force in response to abnormal sound detection signals at specified detection frequencies. In response to the vibration force, the peripheral interface device generates a vibration sound wave. Then, a small number of audio collectors (e.g., a single microphone or a single row of microphones) are used to collect the vibration sound wave, and a vibration audio signal is correspondingly generated. Afterwards, the abnormal sound detection device judges whether there is an abnormal sound phenomenon in the collected vibration audio signal.

However, the conventional technologies still has some drawbacks. As mentioned above, a small number of audio collectors in the conventional abnormal sound detection device are used to collect the vibration sound wave and generate the vibration audio signal. If the installation positions of the audio collectors are fixed, some problems occur. For example, since the distances between various regions of the under-test passive component (e.g., various keys in different regions of the key mechanical structure) and the fixed-type audio collectors are different, it is difficult to actually identify the regions of the under-test passive component where the abnormal sound is generated by judging the collected vibration audio signals. Furthermore, in case that the sound-receiving coverage range of the fixed-type audio collectors is unable to match the size of the passive component, a portion of the abnormal sound cannot be effectively detected.

In order to solve the above problems, another conventional abnormal sound detection device is equipped with movable-type audio collectors. The movable-type audio collectors collect the vibration audio signals in a movable manner. Consequently, the full-size range of the under-test passive component can be effectively detected. However, the uses of the movable-type audio collectors still have some drawbacks. For example, the abnormal sound detection signal is usually a frequency-sweeping abnormal sound detection signal. The frequency-sweeping abnormal sound detection signal is a test sub-signal whose test frequency range gradually rises to 20 kHz from zero or gradually decreases to zero from 20 kHz within a certain time interval. Since the movable-type audio collectors are usually moved forwardly to unceasingly and continuously collect sound, some drawbacks occur. For example, when a specified region of the key mechanical structure (e.g., the left key region of the key mechanical structure) has the abnormal sound phenomenon in response to the test frequency, the movable-type audio collector has been moved in the direction away from the specified region of the key mechanical structure and moved to another region of the key mechanical structure (e.g., the right key region of the key mechanical structure). That is, since the specified region of the key mechanical structure is not within the preferred sound-receiving range of the movable-type audio collector, the movable-type audio collector is unable to effectively detect the abnormal sound phenomenon of the specified region of the key mechanical structure. Consequently, the abnormal sound detection accuracy and the detecting quality of the electronic product will be impaired.

Therefore, it is important to provide an abnormal sound detection device with a movable-type audio collecting device in order to comply with various types of abnormal sound detection signals and increase the abnormal sound detection accuracy and the detecting quality.

SUMMARY OF THE INVENTION

The present invention provides an abnormal sound detection device and an abnormal sound detection method applied to the abnormal sound detection device. The abnormal sound is collected in a movable manner. In addition, the abnormal sound detection device and the abnormal sound detection method can be used to detect various types of abnormal sound detection signals.

The present invention provides an abnormal sound detection device and an abnormal sound detection method for collecting the abnormal sound in a movable manner and efficiently and quickly analyzing the abnormal sound phenomenon of the vibration audio signal.

In accordance with an aspect of the present invention, an abnormal sound detection device for detecting a peripheral interface device is provided. The abnormal sound detection device includes a vibration simulation mechanism, a movable-type audio collecting device and a controlling and analyzing device. The vibration simulation mechanism includes a mechanism body. The peripheral interface device is accommodated within the mechanism body. The vibration simulation mechanism generates a vibration force. The peripheral interface device generates a vibration sound wave in response to the vibration force. The movable-type audio collecting device is located near the mechanism body. The movable-type audio collecting device collects the vibration sound wave. The audio collecting device generates a vibration audio signal in response to the vibration sound wave. The controlling and analyzing device is electrically connected with the vibration simulation mechanism and the movable-type audio collecting device. The controlling and analyzing device generates an abnormal sound detection signal to control the vibration simulation mechanism to generate the vibration force. The vibration audio signal from the audio collecting device is inputted into the controlling and analyzing device. The controlling and analyzing device detects and identifies whether there is an abnormal sound phenomenon in the vibration audio signal. The abnormal sound detection signal contains a movement control sub-signal and a test sub-signal. The movement control sub-signal is transmitted to the movable-type audio collecting device. The test sub-signal is transmitted to the vibration simulation mechanism. In response to the movement control sub-signal, the plural movable audio collection units are moved along plural movement trajectory segments and plural stopping points over the peripheral interface device in a go/stop mode. When the movable-type audio collecting device is moved to the plural stopping points, plural effective identification vibration audio sections of the vibration audio signal are generated. The plural movement trajectory segments are separated from each other by the plural stopping points.

In an embodiment, the peripheral interface device at least includes a key mechanical structure.

In an embodiment, the vibration simulation mechanism includes the mechanism body and a vibration generator. The peripheral interface device is accommodated within the mechanism body. The vibration generator is located near the mechanism body and electrically connected with the controlling and analyzing device. The vibration generator generates the vibration force in response to the test sub-signal. The vibration force is transmitted from the vibration generator to the peripheral interface device within the mechanism body.

In an embodiment, the mechanism body at least includes an upper cover and a base plate, and the peripheral interface device is arranged between the upper cover and the base plate. The vibration generator is located near or attached on the base plate.

In an embodiment, the test sub-signal is a frequency-sweeping test sub-signal or a pink noise test sub-signal. The vibration simulation mechanism generates the vibration force in response to the frequency-sweeping test sub-signal or the pink noise test sub-signal. The peripheral interface device generates the vibration sound wave in response to the vibration force.

In an embodiment, the movable-type audio collecting device includes plural movable audio collection units, and each of the plural movable audio collection units includes at least one audio collector. The audio collector is a microphone or a sound guide tube.

In an embodiment, the movable-type audio collecting device further includes a driving motor. In response to the movement control sub-signal, the driving motor drives movement of the plural movable audio collection units along plural movement trajectories over an under-test region of the peripheral interface device in the go/stop mode. Each of the plural movement trajectories includes the plural movement trajectory segments and the plural stopping points. The plural movement trajectory segments are separated from each other by the plural stopping points.

In an embodiment, the distances of the plural movement trajectory segments are equal, or the distances of at least two of the plural movement trajectory segments are different.

In an embodiment, a start trajectory segment is defined before the movable-type audio collecting device enters the under-test region of the peripheral interface device, and an end trajectory segment is defined after the movable-type audio collecting device leaves the under-test region of the peripheral interface device. Each of the plural movement trajectories contains the start trajectory segment, the plural movement trajectory segments, the plural stopping points and the end trajectory segment sequentially.

In an embodiment, a distance of the start trajectory segment and a distance of the end trajectory segment are equal, and the distance of each of the start trajectory segment and the end trajectory segment is shorter than a distance of each of the movement trajectory segments.

In an embodiment, a first time period of moving the movable-type audio collecting device along each of the plural movement trajectory segments, a second time period of staying the movable-type audio collecting device at each of the stopping points and a third time period of moving the movable-type audio collecting device along each of the start trajectory segment and the end trajectory segment are equal.

In an embodiment, the plural effective identification vibration audio sections of the vibration audio signal are collected and assembled as a vibration audio unit identification signal. The controlling and analyzing device judges whether there is an abnormal sound phenomenon in the vibration audio unit identification signal.

In accordance with another aspect of the present invention, an abnormal sound detection method for detecting a peripheral interface device is provided. The abnormal sound detection method includes the following steps. In a step (a), vibration simulation mechanism is provided. The peripheral interface device is accommodated within the vibration simulation mechanism. In a step (b), a movable-type audio collecting device is placed near the vibration simulation mechanism. The movable-type audio collecting device includes plural movable audio collection units. Each of the plural movable audio collection units includes at least one audio collector. In a step (c), the plural movable audio collection units are moved along plural movement trajectories over the peripheral interface device in a go/stop mode in response to a movement control sub-signal of an abnormal sound detection signal. Each of the plural movement trajectories includes plural movement trajectory segments and plural stopping points. The plural movement trajectory segments are separated from each other by the plural stopping points. In a step (d), a vibration force is generated by the vibration simulation mechanism in response to a test sub-signal of the abnormal sound detection signal. The peripheral interface device generates a vibration sound wave in response to the vibration force. In a step (e), a vibration audio signal containing plural vibration audio unit signals are generated by the plural movable audio collection units, and the vibration audio signal is transmitted to a controlling and analyzing device. Moreover, plural effective identification vibration audio sections of the vibration audio signal are respectively generated when each of the plural movable audio collection units is stayed at the stopping points. In a step (f), the plural effective identification vibration audio sections of the vibration audio signal are collected, and the plural effective identification vibration audio sections are assembled s plural vibration audio unit identification signals. The controlling and analyzing device judges whether there is an abnormal sound phenomenon in any of the plural vibration audio unit identification signals.

In an embodiment, the peripheral interface device at least includes a key mechanical structure.

In an embodiment, each of the at least one audio collector is a microphone or a sound guide tube.

In an embodiment, the distances of the plural movement trajectory segments are equal, or the distances of at least two of the plural movement trajectory segments are different.

In an embodiment, a start trajectory segment is defined before the movable-type audio collecting device enters the under-test region of the peripheral interface device, and an end trajectory segment is defined after the movable-type audio collecting device leaves the under-test region of the peripheral interface device. Each of the plural movement trajectories contains the start trajectory segment, the plural movement trajectory segments, the plural stopping points and the end trajectory segment sequentially.

In an embodiment, a distance of the start trajectory segment and a distance of the end trajectory segment are equal, and the distance of each of the start trajectory segment and the end trajectory segment is shorter than a distance of each of the movement trajectory segments.

In an embodiment, a first time period of moving the movable-type audio collecting device along each of the plural movement trajectory segments, a second time period of staying the movable-type audio collecting device at each of the stopping points and a third time period of moving the movable-type audio collecting device along each of the start trajectory segment and the end trajectory segment are equal.

In an embodiment, the test sub-signal is a frequency-sweeping test sub-signal or a pink noise test sub-signal. The vibration simulation mechanism generates the vibration force in response to the frequency-sweeping test sub-signal or the pink noise test sub-signal. The peripheral interface device generates the vibration sound wave in response to the vibration force.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
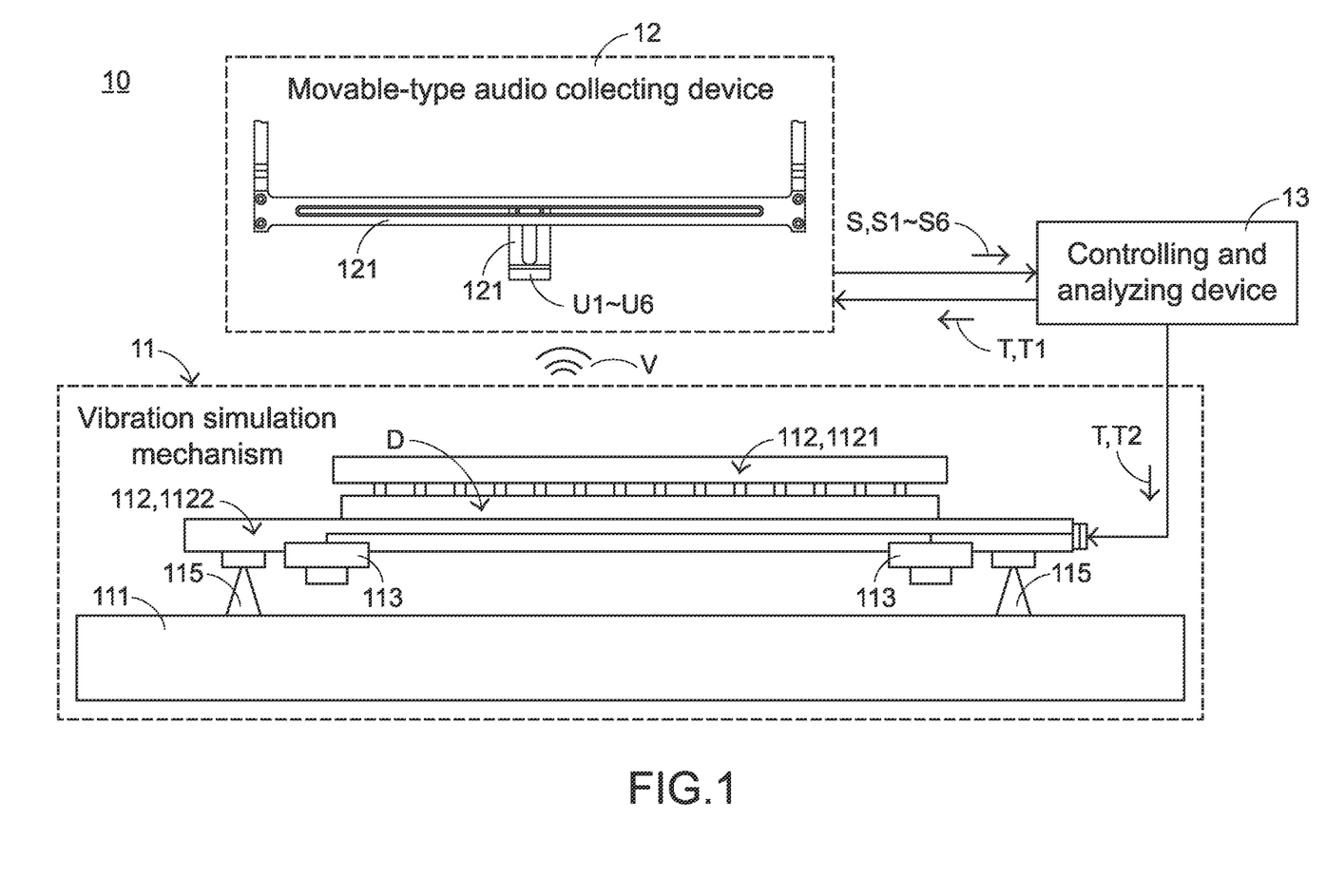
FIG. 1 schematically illustrates the architecture of an abnormal sound detection device according to an embodiment of the present invention.
Figure 2A:
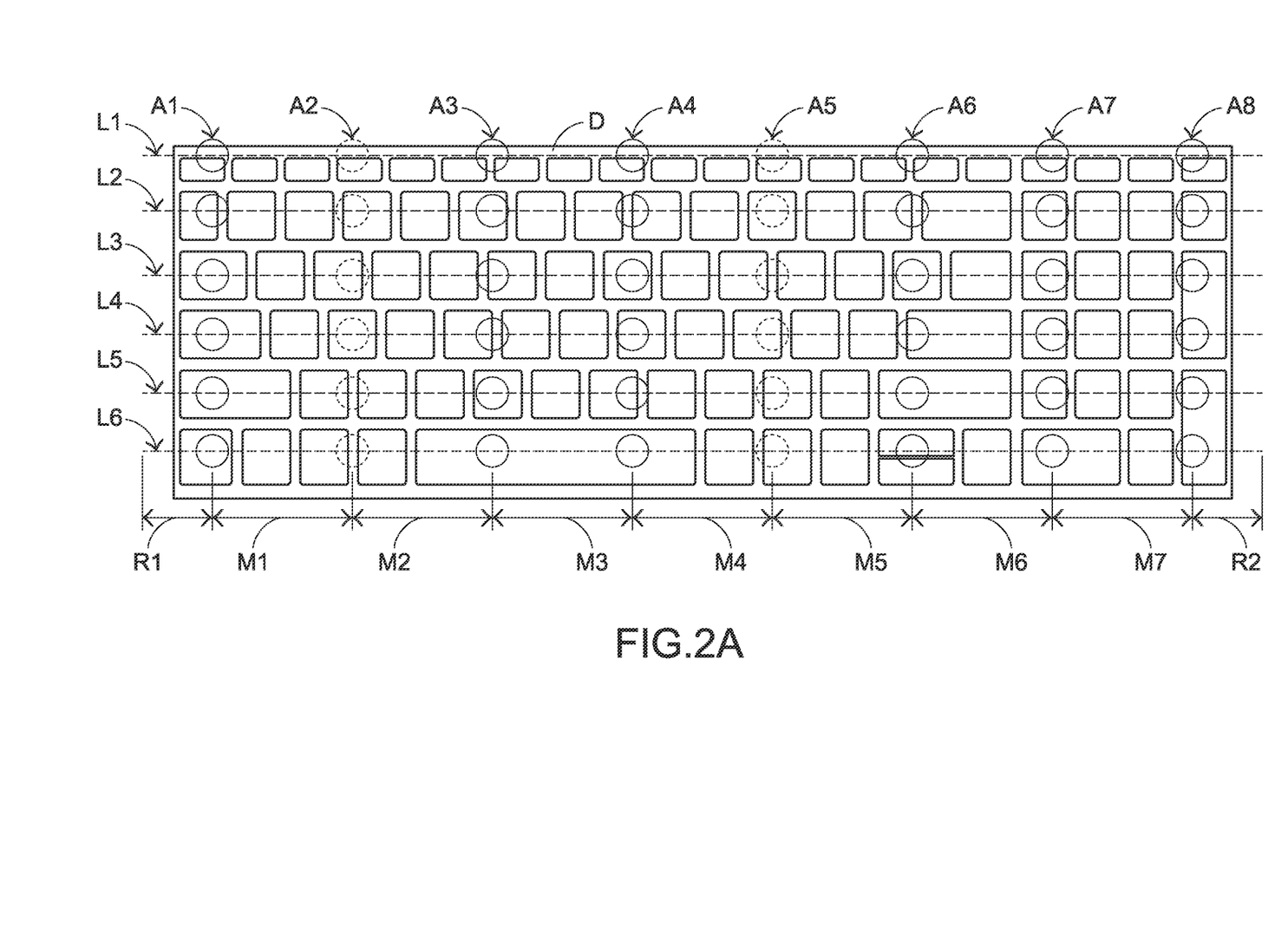
FIG. 2A schematically illustrates plural movement trajectories of a movable-type audio collecting device with plural movable audio collection units, in which the plural movement trajectories are formed over an under-test region of a peripheral interface device.

FIG. 1 schematically illustrates the architecture of an abnormal sound detection device according to an embodiment of the present invention. FIG. 2A schematically illustrates plural movement trajectories of a movable-type audio collecting device with plural movable audio collection units, in which the plural movement trajectories are formed over an under-test region of a peripheral interface device.

As shown in FIG. 1, the abnormal sound detection device 10 is used for detecting a peripheral interface device D (e.g., a key mechanical structure). The abnormal sound detection device 10 at least comprises a vibration simulation mechanism 11, a movable-type audio collecting device 12 and a controlling and analyzing device 13.

In an embodiment, the vibration simulation mechanism 11 comprises a detection platform 111, a mechanism body 112 and a vibration generator 113. The peripheral interface device D is accommodated within the mechanism body 112. The vibration generator 113 is located near the mechanism body 112.

The mechanism body 112 is installed on the detection platform 111 through plural anti-vibration elements 115. That is, the plural anti-vibration elements 115 are arranged between the detection platform 111 and the mechanism body 112. The anti-vibration elements 115 can be used as buffering structures between the detection platform 111 and the mechanism body 112.

The mechanism body 112 at least comprises an upper cover 1121 and a base plate 1122. The peripheral interface device D is arranged between the upper cover 1121 and the base plate 1122. Preferably but not exclusively, the vibration generator 113 is located near or attached on the base plate 1122.

The movable-type audio collecting device 12 is located near the mechanism body 112. In an embodiment, the movable-type audio collecting device 12 comprises a moving mechanism 121 and a driving motor (not shown). The moving mechanism 121 is capable of performing a moving operation. The driving motor is used for driving the moving mechanism 121 to perform the moving operation.

In an embodiment, the movable-type audio collecting device 12 comprises plural movable audio collection units. Each movable audio collection unit comprises at least one audio collector. For example, the movable-type audio collecting device 12 comprises six movable audio collection units U1~U6. For illustration, each of the six movable audio collection units U1~U6 comprises at least one audio collector.

Preferably but not exclusively, the audio collector is a microphone or a sound guide tube.

The controlling and analyzing device 13 is used for generating an abnormal sound detection signal T. In an embodiment, the abnormal sound detection signal T contains a movement control sub-signal T1 and a test sub-signal T2. The movement control sub-signal T1 is transmitted to the movable-type audio collecting device 12. The test sub-signal T2 is transmitted to the vibration simulation mechanism 11.

In accordance with a feature of the present invention, the six movable audio collection units U1~U6 of the movable-type audio collecting device 12 are controlled in response to the movement control sub-signal T1. Consequently, the six movable audio collection units U1~U6 are respectively moved along plural movement trajectories (e.g., six movement trajectories L1~L6) over the peripheral interface device D in a go/stop mode. Each of the six movement trajectories L1~L6 comprises plural movement trajectory segments (e.g., seven movement trajectory segments M1~M7) and plural stopping points (e.g., eight stopping points A1~A8). In addition, the plural movement trajectory segments are separated from each other by the plural stopping points.

Before each of the six movable audio collection units U1~U6 of the movable-type audio collecting device 12 enters an under-test region of the peripheral interface device D, a start trajectory segment R1 is defined. After each of the six movable audio collection units U1~U6 of the movable-type audio collecting device 12 leaves the under-test region of the peripheral interface device D, an end trajectory segment R2 is defined. In other words, each of the six movement trajectories L1~L6 contains the start trajectory segment R1, the seven movement trajectory segments M1~M7 (and the eight stopping points A1~A8) and the end trajectory segment R2 sequentially.

In an embodiment, the distances of the movement trajectory segments M1~M7 are equal. For example, the distance of each of the movement trajectory segments M1~M7 is 45 mm. Alternatively, the distances of at least two of the movement trajectory segments M1~M7 are different.

Preferably, the distances of the start trajectory segment R1 and the end trajectory segment R2 are equal. In addition, the distance of each of the start trajectory segment R1 and the end trajectory segment R2 is shorter than the distance of each of the movement trajectory segments M1~M7. For example, the distance of each of the start trajectory segment R1 and the end trajectory segment R2 is about a half of the distance of each of the movement trajectory segments M1~M7. For example, the distance of each of the start trajectory segment R1 and the end trajectory segment R2 is 22.5 mm.

In an embodiment, a first time period of moving each of the six movable audio collection units U1~U6 along each of the movement trajectory segments M1~M7, a second time period of staying each of the six movable audio collection units U1~U6 at each of the stopping points A1~A8 and a third time period of moving each of the six movable audio collection units U1~U6 along each of the start trajectory segment R1 and the end trajectory segment R2 are equal.

For example, each of the first time period, the second time period and the third time period is 2 seconds. In other words, the total time period of moving each of the movable audio collection units U1~U6 along each of the movement trajectories L1~L6 is 34 seconds, i.e., 2+7×2+8×2+2=34 (seconds). In addition, the total distance of each of the movement trajectories L1~L6 is 360 mm, i.e., 22.5 mm+7×45 mm+22.5 mm=360 mm.

After the time period and the distance of moving each of the six movable audio collection units U1~U6 along each of the movement trajectory segments M1~M7 and the time period and the distance of moving each of the six movable audio collection units U1~U6 along each of the start trajectory segment R1 and the end trajectory segment R2 are determined, the speed of moving each of the six movable audio collection units U1~U6 along each of the movement trajectory segments M1~M7 and the speed of moving each of the six movable audio collection units U1~U6 along each of the start trajectory segment R1 and the end trajectory segment R2 are obtained.

Moreover, the time period and the distance of moving each of the six movable audio collection units U1~U6 along each of the movement trajectory segments M1~M7, the time period of staying each of the six movable audio collection units U1~U6 at each of the stopping points A1~A8 and the time period and the distance of moving each of the six movable audio collection units U1~U6 along each of the start trajectory segment R1 and the end trajectory segment R2 may be varied according to the total length of the under-test region of the peripheral interface device D and/or the practical requirements.

In response to a test sub-signal T2 of the abnormal sound detection signal T from the controlling and analyzing device 13, the vibration simulation mechanism 11 is controlled to generate a vibration force. In response to the vibration force, the peripheral interface device D generates a vibration sound wave V. In response to the vibration sound wave V, the six movable audio collection units U1~U6 of the movable-type audio collecting device 12 generates a vibration audio signal S. The vibration audio signal S contains six vibration audio unit signals S1~S6. The vibration audio signal S is inputted into the controlling and analyzing device 13. Consequently, the controlling and analyzing device 13 detects and identifies whether there is an abnormal sound phenomenon in the vibration audio signal S.

In accordance with a feature of the present invention, each of the six movable audio collection units U1~U6 is stayed at each of the stopping points A1~A8 for a certain stay time period. In case that the test sub-signal T2 of the abnormal sound detection signal T is one of a frequency-sweeping test sub-signal and a pink noise test sub-signal and provided to the vibration simulation mechanism 11 in the stay time period, the vibration simulation mechanism 11 is controlled to generate the vibration force, and the peripheral interface device D generates the vibration sound wave V in response to the vibration force. In addition, different under-test regions of the peripheral interface device D can be tested at the nearly consistent test frequency. Moreover, since the audio collection units are able to stably receive the sound in the stay time period, the drawbacks of the conventional technologies can be overcome.

The frequency-sweeping sub-test sub-signal is a test sub-signal whose test frequency range gradually rises to 20 kHz from zero or gradually decreases to zero from 20 kHz within a certain time interval. The pink noise test sub-signal is a 0~20 kHz mixed-frequency test sub-signal whose power spectral density (PSD) is higher in the low frequency range and gradually decreases from the low frequency to the high frequency. It is noted that the test sub-signal T2 is not restricted to the frequency-sweeping test sub-signal or the pink noise test sub-signal.

Figure 2B:
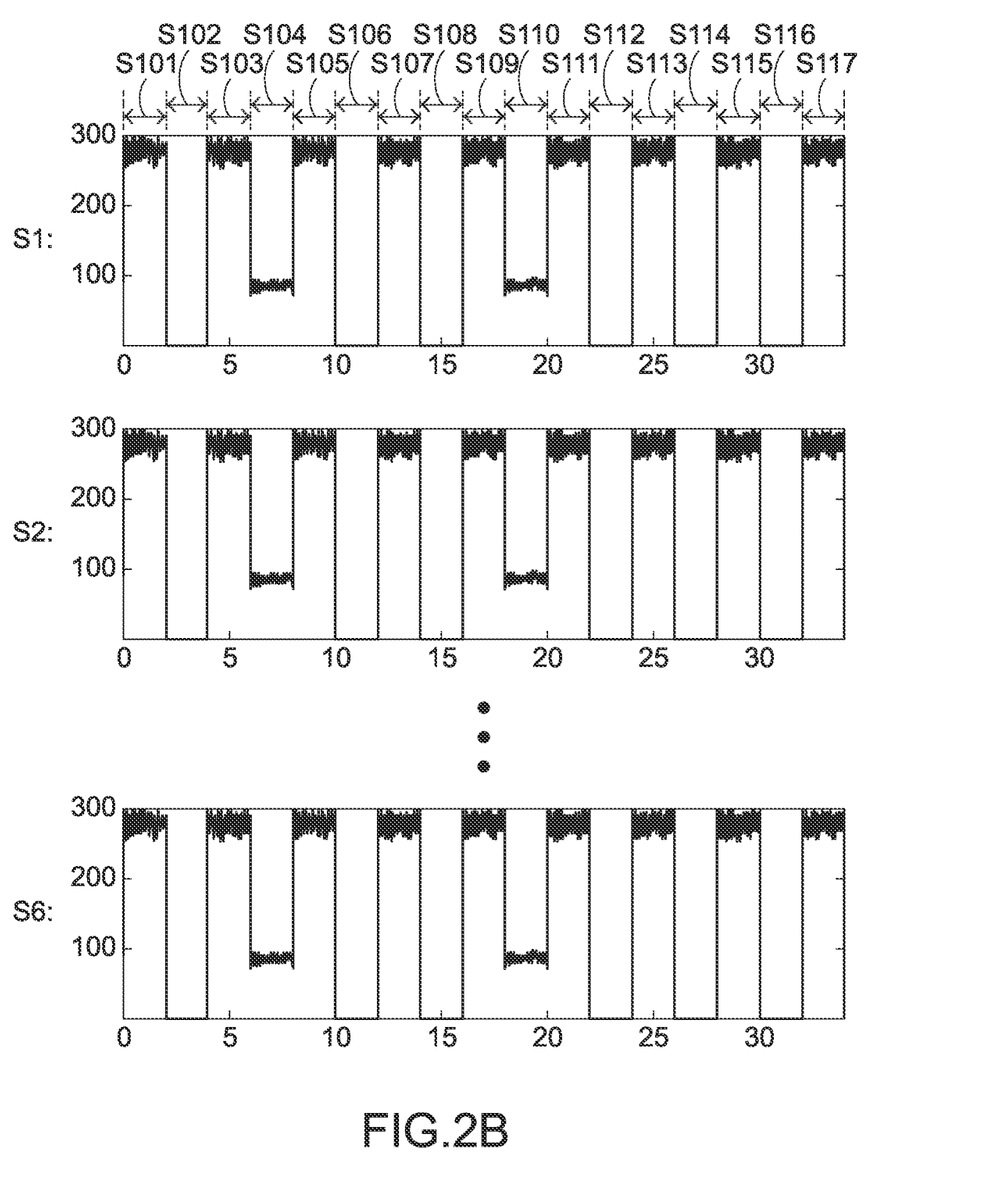
FIG. 2B is a schematic timing waveform diagram illustrating the six vibration audio unit signals S1~S6 of the vibration audio signal S generated by the six movable audio collection units U1~U6 of the abnormal sound detection device according to the embodiment of the present invention.

FIG. 2B is a schematic timing waveform diagram illustrating the six vibration audio unit signals S1~S6 of the vibration audio signal S generated by the six movable audio collection units U1~U6 of the abnormal sound detection device according to the embodiment of the present invention. Each of the six vibration audio unit signals S1~S6 denotes a moving status or a staying status of the corresponding one of the movable audio collection units U1~U6.

Each of the six vibration audio unit signals S1~S6 is divided into plural vibration audio sections S101~S117. The vibration audio sections S101, S103, S105, S107, S109, S111, S113, S115 and S117 are collected when the movable audio collection units U1~U6 are in the moving status. That is, the vibration audio sections S101, S103, S105, S107, S109, S111, S113, S115 and S117 are respectively collected when each of the movable audio collection units U1~U6 is moved along the start trajectory segment R1, the movement trajectory segments M1~M7 and the end trajectory segment R2. The vibration audio sections S102, S104, S106, S108, S110, S112, S114 and S116 are collected when the movable audio collection units U1~U6 are in the staying status. That is, the vibration audio sections S102, S104, S106, S108, S110, S112, S114 and S116 are respectively collected when the movable audio collection units U1~U6 are stayed at the stopping points A1~A8.

As mentioned above, the vibration audio sections S101, S103, S105, S107, S109, S111, S113, S115 and S117 are collected when the movable audio collection units U1~U6 are in the moving status. In other words, the vibration audio sections S101, S103, S105, S107, S109, S111, S113, S115 and S117 are usually noise signals, e.g., background noise or operating noise from the driving motor. Consequently, the vibration audio sections S101, S103, S105, S107, S109, S111, S113, S115 and S117 may be regarded as ineffective identification vibration audio sections.

As mentioned above, the vibration audio sections S102, S104, S106, S108, S110, S112, S114 and S116 are respectively collected when the movable audio collection units U1~U6 are stayed at the stopping points A1~A8 in the stay time period. In response to the vibration sound wave V, the six movable audio collection units U1~U6 of the movable-type audio collecting device 12 generates the vibration audio signal. Consequently, the vibration audio sections S102, S104, S106, S108, S110, S112, S114 and S116 may be regarded as effective identification vibration audio sections.

Figure 3:
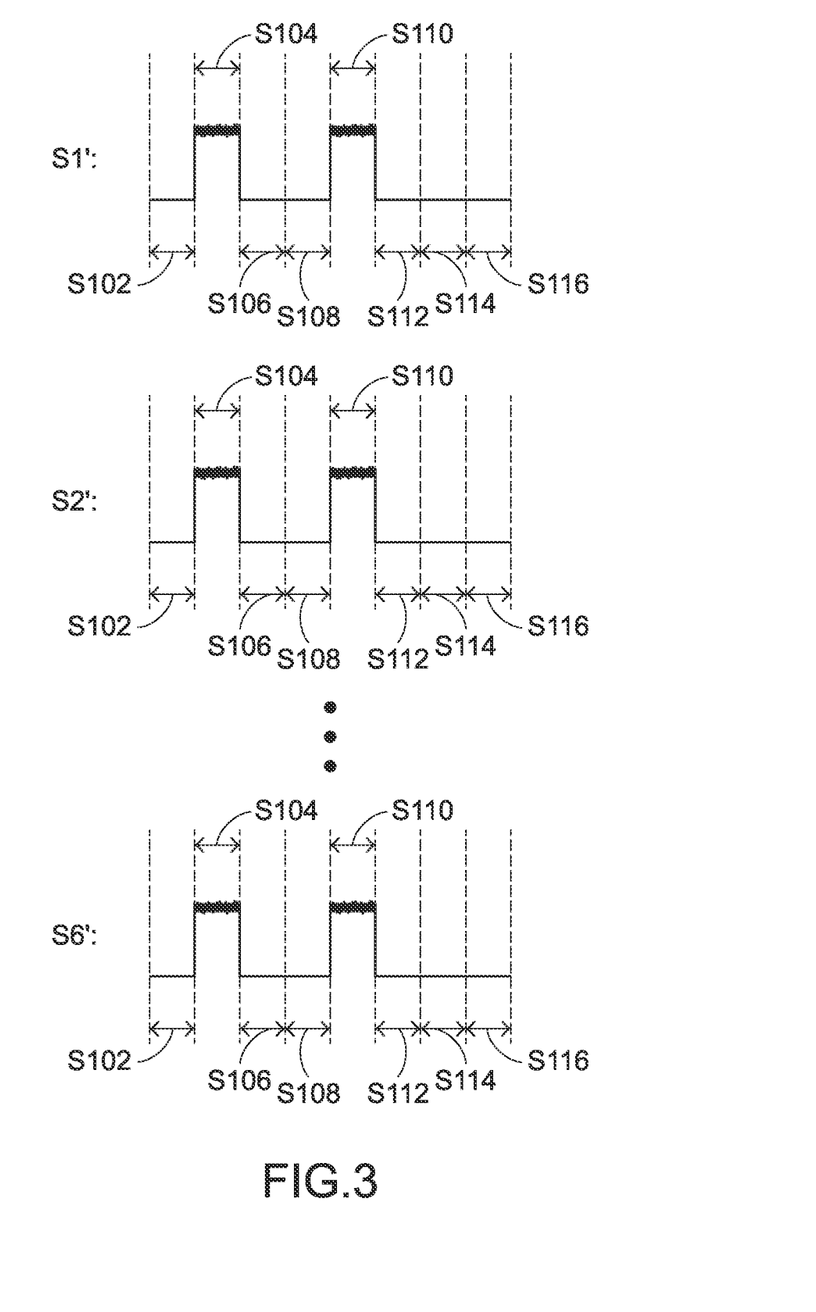
FIG. 3 schematically illustrates the vibration audio unit identification signals S1'~S6' that are assembled from the effective identification vibration audio sections of the vibration audio unit signals S1~S6.

In accordance with another feature of the present invention, the effective identification vibration audio sections S102, S104, S106, S108, S110, S112, S114 and S116 are generated when the movable audio collection units U1~U6 are stayed at the stopping points A1~A8 in the stay time period. Especially, as shown in FIG. 3, the effective identification vibration audio sections S102, S104, S106, S108, S110, S112, S114 and S116 in each of the vibration audio unit signals S1~S6 are assembled as plural vibration audio unit identification signals S1'~S6'. The controlling and analyzing device 13 can judge whether any of the vibration audio unit identification signals S1'~S6' has an abnormal sound phenomenon more quickly. That is, the judging result is not interfered by the ineffective identification vibration audio sections S101, S103, S105, S107, S109, S111, S113, S115 and S117.

In FIG. 3, the vibration audio unit identification signals S1'~S6' that are assembled from the effective identification vibration audio sections of the vibration audio unit signals S1~S6 are shown. The effective identification vibration audio sections are generated when the movable audio collection units U1~U6 are stayed at the stopping points A1~A8 in the stay time period. Obviously, as shown in FIG. 3, there is the abnormal sound phenomena in the effective identification vibration audio sections S104 and S110. As shown in FIG. 2A, the stopping points A2 and A5 marked with dotted circles are mechanism regions corresponding to the effective identification vibration audio sections S104 and S110, respectively. That is, these mechanism regions are the possible regions where there are assembling structure defects.

Furthermore, the effective identification vibration audio sections S104 and S110 in each of the vibration audio unit identification signals S1'~S6' corresponding to the stopping points A2 and A5 of FIG. 2A (i.e., the stopping points marked with dotted circles) have the abnormal sound phenomena. It is noted that the implement example of the present invention is not restricted.

It is noted that numerous modifications and alterations may be made while retaining the teachings of the invention. Please refer to FIGS. 2A and 2B again. In another embodiment, the stopping point A2 shown in FIG. 2A is related to the effective identification vibration audio section S104 as shown in FIG. 2B. For example, the effective identification vibration audio section S104 in each of the vibration audio unit identification signals S1', S2' and S6' has the abnormal sound phenomenon (e.g., noise), but the effective identification vibration audio section S104 in each of the vibration audio unit identification signal S3', S4' and S5' does not have the abnormal sound phenomenon (i.e., without noise). Consequently, the regions where there are assembling structure defects can be located more precisely. For example, the assembling structure defects occur at the intersections of the movement trajectories L1, L2, L6 and the stopping point A2.

Figure 4A:
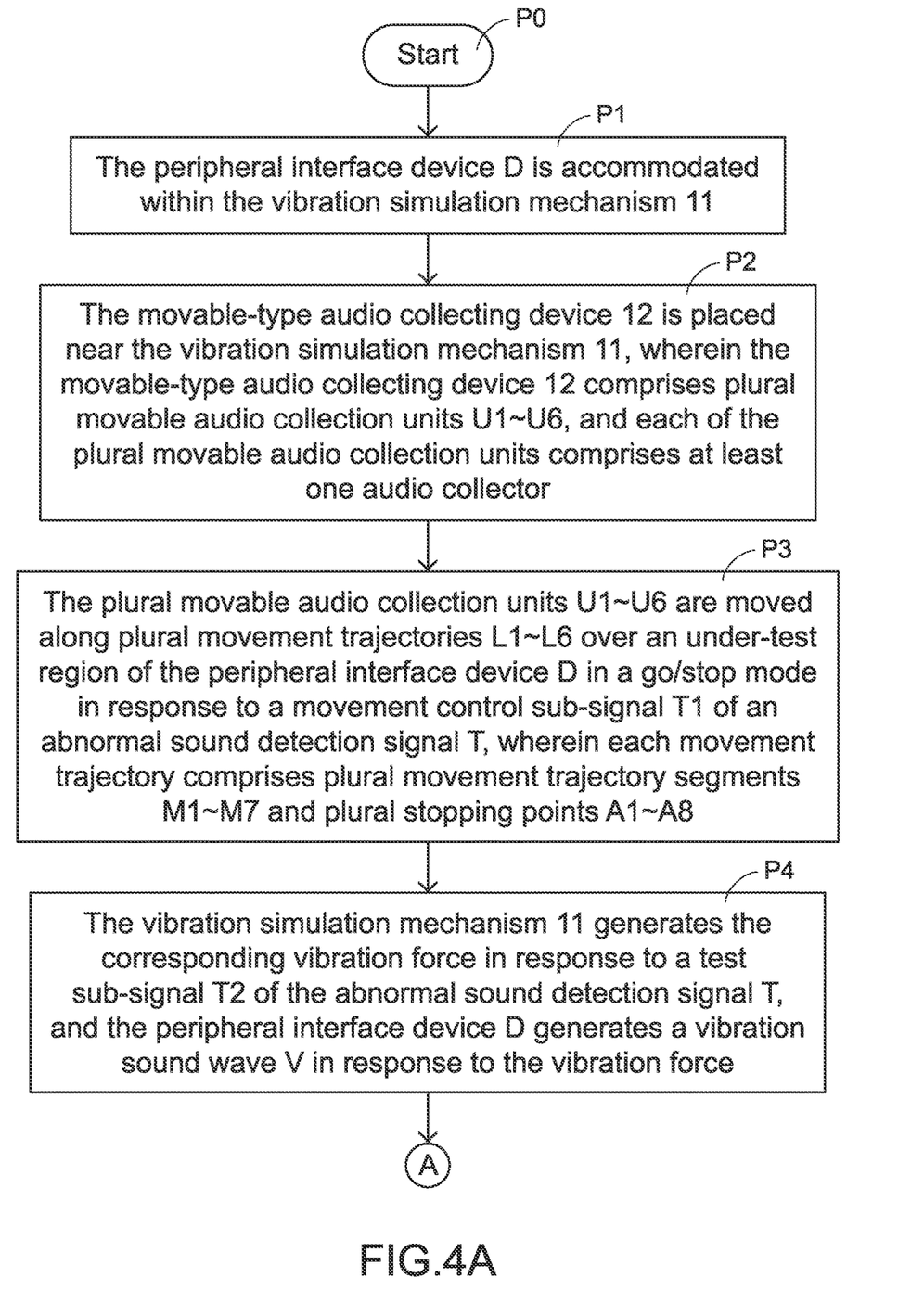
FIGS. 4A and 4B schematically illustrate the flowchart of an abnormal sound detection method according to an embodiment of the present invention.
Figure 4B:
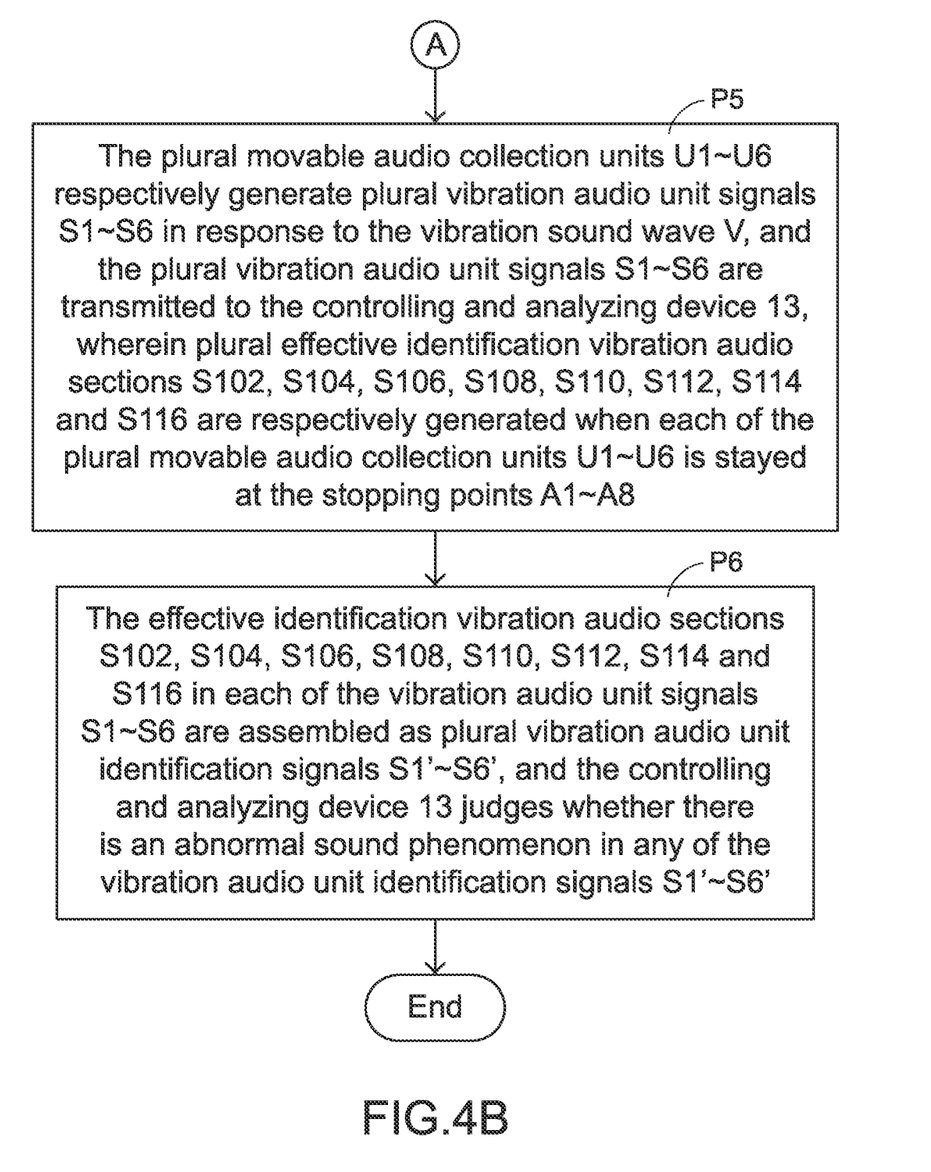

The present invention also provides an abnormal sound detection method. The abnormal sound detection method is applied to the peripheral interface device D. Please refer to FIGS. 1 to 3 and FIGS. 4A and 4B. FIGS. 4A and 4B schematically illustrate the flowchart of an abnormal sound detection method according to an embodiment of the present invention.

In a step P0, the flowchart is started.

In a step P1, the vibration simulation mechanism 11 is provided, and the peripheral interface device D is accommodated within the vibration simulation mechanism 11.

In a step P2, the movable-type audio collecting device 12 is placed near the vibration simulation mechanism 11, wherein the movable-type audio collecting device 12 comprises plural movable audio collection units U1~U6, and each of the plural movable audio collection units comprises at least one audio collector.

In a step P3, the plural movable audio collection units U1~U6 are moved along plural movement trajectories L1~L6 over an under-test region of the peripheral interface device D in a go/stop mode in response to a movement control sub-signal T1 of an abnormal sound detection signal T, wherein each movement trajectory comprises plural movement trajectory segments M1~M7 and plural stopping points A1~A8, and the plural movement trajectory segments M1~M7 are separated from each other by the plural stopping points A1~A8.

In a step P4, the vibration simulation mechanism 11 generates the corresponding vibration force in response to a test sub-signal T2 of the abnormal sound detection signal T, and the peripheral interface device D generates a vibration sound wave V in response to the vibration force.

In a step P5, the plural movable audio collection units U1~U6 respectively generate plural vibration audio unit signals S1~S6 in response to the vibration sound wave V, and the plural vibration audio unit signals S1~S6 are transmitted to the controlling and analyzing device 13, wherein plural effective identification vibration audio sections S102, S104, S106, S108, S110, S112, S114 and S116 are respectively generated when each of the plural movable audio collection units U1~U6 is stayed at the stopping points A1~A8.

In a step P6, the effective identification vibration audio sections S102, S104, S106, S108, S110, S112, S114 and S116 in each of the vibration audio unit signals S1~S6 are assembled as a corresponding vibration audio unit identification signal of plural vibration audio unit identification signals S1'~S6', and the controlling and analyzing device 13 judges whether there is an abnormal sound phenomenon in any of the vibration audio unit identification signals S1'~S6'.

From the above descriptions, the present invention provides an abnormal sound detection device and an abnormal sound detection method applied to the abnormal sound detection device. The abnormal sound detection device and the abnormal sound detection method can be used to detect various types of abnormal sound detection signals and efficiently and quickly analyze the abnormal sound detection signals. In other words, the abnormal sound detection device and the abnormal sound detection method of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An abnormal sound detection device for detecting a peripheral interface device, the abnormal sound detection device comprising:
   a vibration simulation mechanism comprising a mechanism body, wherein the peripheral interface device is accommodated within the mechanism body, the vibration simulation mechanism generates a vibration force, and the peripheral interface device generates a vibration sound wave in response to the vibration force;
   a movable-type audio collecting device located near the mechanism body, wherein the movable-type audio collecting device collects the vibration sound wave, and the audio collecting device generates a vibration audio signal in response to the vibration sound wave; and
   a controlling and analyzing device electrically connected with the vibration simulation mechanism and the movable-type audio collecting device, wherein the controlling and analyzing device generates an abnormal sound detection signal to control the vibration simulation mechanism to generate the vibration force, the vibration audio signal from the audio collecting device is inputted into the controlling and analyzing device, and the controlling and analyzing device detects and identifies whether there is an abnormal sound phenomenon in the vibration audio signal,
   wherein the abnormal sound detection signal contains a movement control sub-signal and a test sub-signal, the movement control sub-signal is transmitted to the movable-type audio collecting device, and the test sub-signal is transmitted to the vibration simulation mechanism,
   wherein in response to the movement control sub-signal, the plural movable audio collection units are moved along plural movement trajectory segments and plural stopping points over the peripheral interface device in a go/stop mode, wherein when the movable-type audio collecting device is moved to the plural stopping points, plural effective identification vibration audio sections of the vibration audio signal are generated, wherein the plural movement trajectory segments are separated from each other by the plural stopping points.

2. The abnormal sound detection device according to claim 1, wherein the peripheral interface device at least includes a key mechanical structure.

3. The abnormal sound detection device according to claim 1, wherein the vibration simulation mechanism comprises:
   the mechanism body, wherein the peripheral interface device is accommodated within the mechanism body; and
   a vibration generator located near the mechanism body and electrically connected with the controlling and analyzing device, wherein the vibration generator generates the vibration force in response to the test sub-signal, and the vibration force is transmitted from the vibration generator to the peripheral interface device within the mechanism body.

4. The abnormal sound detection device according to claim 3, wherein the mechanism body at least comprises an upper cover and a base plate, and the peripheral interface device is arranged between the upper cover and the base plate, wherein the vibration generator is located near or attached on the base plate.

5. The abnormal sound detection device according to claim 3, wherein the test sub-signal is a frequency-sweeping test sub-signal or a pink noise test sub-signal, wherein the vibration simulation mechanism generates the vibration force in response to the frequency-sweeping test sub-signal or the pink noise test sub-signal, and the peripheral interface device generates the vibration sound wave in response to the vibration force.

6. The abnormal sound detection device according to claim 1, wherein the movable-type audio collecting device comprises plural movable audio collection units, and each of the plural movable audio collection units comprises at least one audio collector, wherein the audio collector is a microphone or a sound guide tube.

7. The abnormal sound detection device according to claim 6, wherein the movable-type audio collecting device further comprises a driving motor, wherein in response to the movement control sub-signal, the driving motor drives movement of the plural movable audio collection units along plural movement trajectories over an under-test region of the peripheral interface device in the go/stop mode, wherein each of the plural movement trajectories comprises the plural movement trajectory segments and the plural stopping points, and the plural movement trajectory segments are separated from each other by the plural stopping points.

8. The abnormal sound detection device according to claim 7, wherein the distances of the plural movement trajectory segments are equal, or the distances of at least two of the plural movement trajectory segments are different.

9. The abnormal sound detection device according to claim 7, wherein a start trajectory segment is defined before the movable-type audio collecting device enters the under-test region of the peripheral interface device, and an end trajectory segment is defined after the movable-type audio collecting device leaves the under-test region of the peripheral interface device, wherein each of the plural movement trajectories contains the start trajectory segment, the plural movement trajectory segments, the plural stopping points and the end trajectory segment sequentially.

10. The abnormal sound detection device according to claim 9, wherein a distance of the start trajectory segment and a distance of the end trajectory segment are equal, and the distance of each of the start trajectory segment and the end trajectory segment is shorter than a distance of each of the movement trajectory segments.

11. The abnormal sound detection device according to claim 9, wherein a first time period of moving the movable-type audio collecting device along each of the plural movement trajectory segments, a second time period of staying the movable-type audio collecting device at each of the stopping points and a third time period of moving the movable-type audio collecting device along each of the start trajectory segment and the end trajectory segment are equal.

12. The abnormal sound detection device according to claim 1, wherein the plural effective identification vibration audio sections of the vibration audio signal are collected and assembled as a vibration audio unit identification signal, and the controlling and analyzing device judges whether there is an abnormal sound phenomenon in the vibration audio unit identification signal.

13. An abnormal sound detection method for detecting a peripheral interface device, the abnormal sound detection method comprising steps of:
  (a) providing a vibration simulation mechanism, wherein the peripheral interface device is accommodated within the vibration simulation mechanism;
  (b) allowing a movable-type audio collecting device to be placed near the vibration simulation mechanism, wherein the movable-type audio collecting device comprises plural movable audio collection units, and each of the plural movable audio collection units comprises at least one audio collector;
  (c) moving the plural movable audio collection units along plural movement trajectories over the peripheral interface device in a go/stop mode in response to a movement control sub-signal of an abnormal sound detection signal, wherein each of the plural movement trajectories comprises plural movement trajectory segments and plural stopping points, and the plural movement trajectory segments are separated from each other by the plural stopping points;
  (d) generating a vibration force by the vibration simulation mechanism in response to a test sub-signal of the abnormal sound detection signal, wherein the peripheral interface device generates a vibration sound wave in response to the vibration force;
  (e) generating a vibration audio signal containing plural vibration audio unit signals by the plural movable audio collection units, and transmitting the vibration audio signal to a controlling and analyzing device, wherein plural effective identification vibration audio sections of the vibration audio signal are respectively generated when each of the plural movable audio collection units is stayed at the stopping points; and
  (f) collecting the plural effective identification vibration audio sections of the vibration audio signal and assembling the plural effective identification vibration audio sections as plural vibration audio unit identification signals, wherein the controlling and analyzing device judges whether there is an abnormal sound phenomenon in any of the plural vibration audio unit identification signals.

14. The abnormal sound detection method according to claim 13, wherein the peripheral interface device at least includes a key mechanical structure.

15. The abnormal sound detection method according to claim 13, wherein each of the at least one audio collector is a microphone or a sound guide tube.

16. The abnormal sound detection method according to claim 13, wherein the distances of the plural movement trajectory segments are equal, or the distances of at least two of the plural movement trajectory segments are different.

17. The abnormal sound detection method according to claim 13, wherein a start trajectory segment is defined before the movable-type audio collecting device enters the under-test region of the peripheral interface device, and an end trajectory segment is defined after the movable-type audio collecting device leaves the under-test region of the peripheral interface device, wherein each of the plural movement trajectories contains the start trajectory segment, the plural movement trajectory segments, the plural stopping points and the end trajectory segment sequentially.

18. The abnormal sound detection method according to claim 17, wherein a distance of the start trajectory segment and a distance of the end trajectory segment are equal, and the distance of each of the start trajectory segment and the end trajectory segment is shorter than a distance of each of the movement trajectory segments.

19. The abnormal sound detection method according to claim 17, wherein a first time period of moving the movable-type audio collecting device along each of the plural movement trajectory segments, a second time period of staying the movable-type audio collecting device at each of the stopping points and a third time period of moving the movable-type audio collecting device along each of the start trajectory segment and the end trajectory segment are equal.

20. The abnormal sound detection method according to claim 13, wherein the test sub-signal is a frequency-sweeping test sub-signal or a pink noise test sub-signal, wherein the vibration simulation mechanism generates the vibration force in response to the frequency-sweeping test sub-signal or the pink noise test sub-signal, and the peripheral interface device generates the vibration sound wave in response to the vibration force.

* * * * *